Aug. 19, 1930.  F. WASILKOWSKI  1,773,656
SHELTER OR SHED FOR AIRCRAFT
Filed April 28, 1928  4 Sheets-Sheet 1

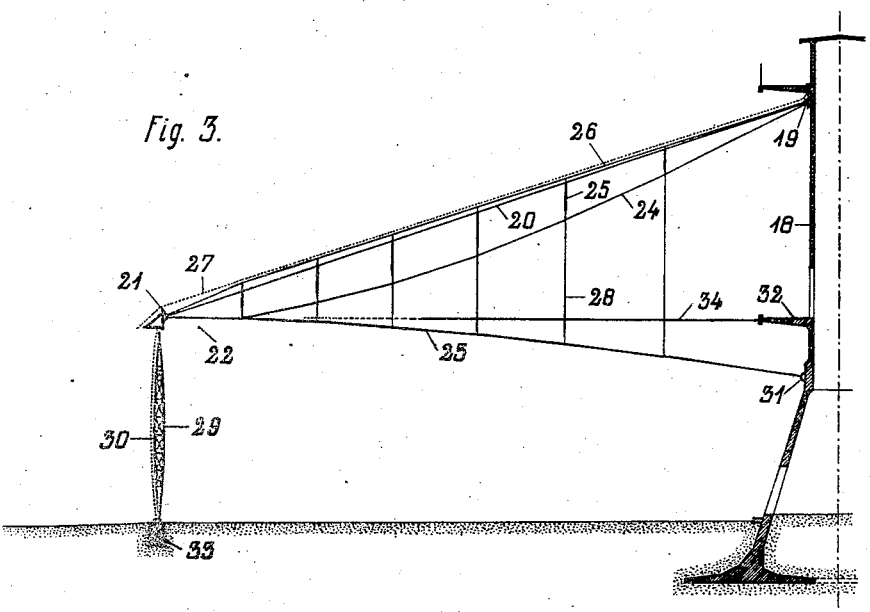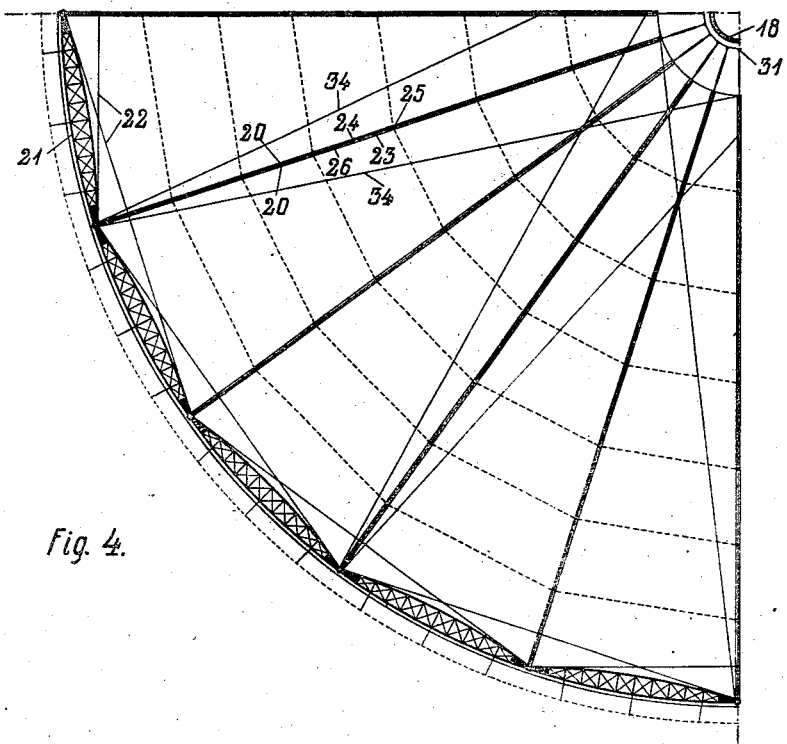

Aug. 19, 1930.  F. WASILKOWSKI  1,773,656
SHELTER OR SHED FOR AIRCRAFT
Filed April 28, 1928  4 Sheets-Sheet 3

Aug. 19, 1930.  F. WASILKOWSKI  1,773,656
SHELTER OR SHED FOR AIRCRAFT
Filed April 28, 1928  4 Sheets-Sheet 4

Patented Aug. 19, 1930

1,773,656

UNITED STATES PATENT OFFICE

FRANCISZEK WASILKOWSKI, OF LWOW, POLAND

SHELTER OR SHED FOR AIRCRAFT

Application filed April 28, 1928, Serial No. 273,625, and in Poland July 25, 1927.

I have filed an application in Poland on the 25th July, 1927, and 29th October, 1927, and in Great Britain on the 12th March, 1928.

The present invention relates to circular shelters or sheds for aircraft, i. e. buildings serving for the housing of aircraft of all types and sizes—from the smallest to the largest. The shed for aircraft according to the invention is especially suitable for very large aircraft, inasmuch as it permits of a degree of efficiency in utilizing the ground space built upon, such as is not attainable with the known sheds or hangars.

The invention consists in a circular shelter or shed for aircraft, characterized in that the round roof of the shelter or shed is not provided with any peripheral supports, but is suspended exclusively by means of lattice structures from a central column, which may, for instance, be constructed in the form of a concrete tower or an ironwork column or the like. This arrangement renders possible the provision of a large number of arcuate sliding wall panels over the whole periphery of the shed, so that an opening of any desired breadth may always be made at any desired part of the periphery; which permits of the bringing in and out of an air vessel of any size without moving other aircraft. If, besides this, according to the invention, a rotary floor is provided at the bottom of the shed, then the further great advantage can be obtained that each air vessel can always be brought in and out in the most favorable direction.

The particularly favourable and economical construction of the roof according to the invention is attained by means of a statically novel roof truss system, which, as compared with the roof truss system in which the main connecting members are constructed in the form of cantilever trusses, offers great advantages statically and from a constructional point of view, as also with regard to the saving of material. According to the new supporting system the roof structure rests on a polygonal ring which is stiffened in the horizontal plane by means of a horizontal lattice girder and in the vertical direction by means of a vertical lattice girder. This polygonal ring is suspended by means of radial tie members, for instance double chains or cables, the free ends of which are fixed at the upper part to the central column. The said polygonal ring is secured against oscillations which might arise from wind action and eccentrically acting loads of snow by means of anchoring cables, whilst on the other hand it is secured against rotational movements by means of tie rods, which, for example, may be attached to each alternate angular point of the polygon and may be fixed tangentially or otherwise to a circular platform arranged on the central column.

The roof supporting structure proper consists of latticed suspension girders, which are arranged between the tie members, and the upper (inner) ends of which are linked to a ring fixed to the central column, whilst the lower outer ends are linked by means of horizontal tie members to the polygonal ring.

By means of this arrangement the result is attained that the whole vertical roof load is transmitted to the ring arranged on the central column, whilst the polygonal ring is only loaded at each angular point by the horizontal tension forces of the connecting rod members. The polygonal ring is therefore subjected concentrically to pressure, and the tie members on which the polygonal ring hangs only carry the weight of the said ring, that of the horizontal and vertical stiffening girders, of the eaves, and possibly of the windows. The lower boom of the latticed suspension girders is formed statically as a funicular curve for the maximum vertical load so that the rest of the girder latticework is not under load in normal circumstances. This provides a very rigid construction with extremely small expenditure of building material, inasmuch as, with the exception of the polygonal ring which is under compression, almost all the rest of the supporting elements of the roof structure are subjected to tension.

Two preferred constructional forms according to the invention are illustrated by way of example in the accompanying drawings, in which:

Fig. 3 is a longitudinal section through one half of a somewhat modified constructional form, Fig. 4 is a plan of a quarter of the shed according to Fig. 3.

Figure 1:
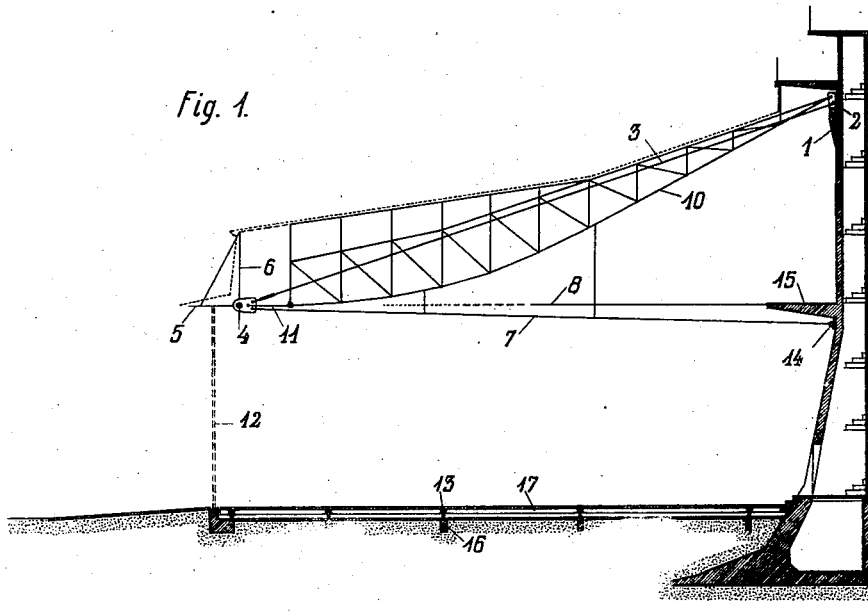
Fig. 1 is a longitudinal section through one half of a shed for aircraft.
Figure 5:
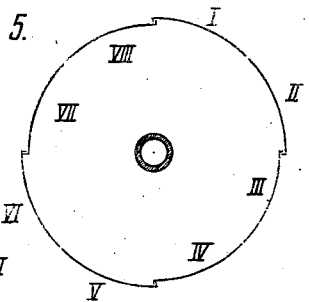
Figure 6:
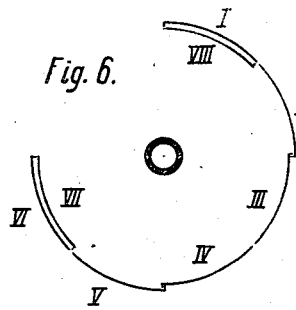
Figure 7:
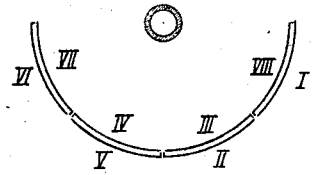
Figure 8:
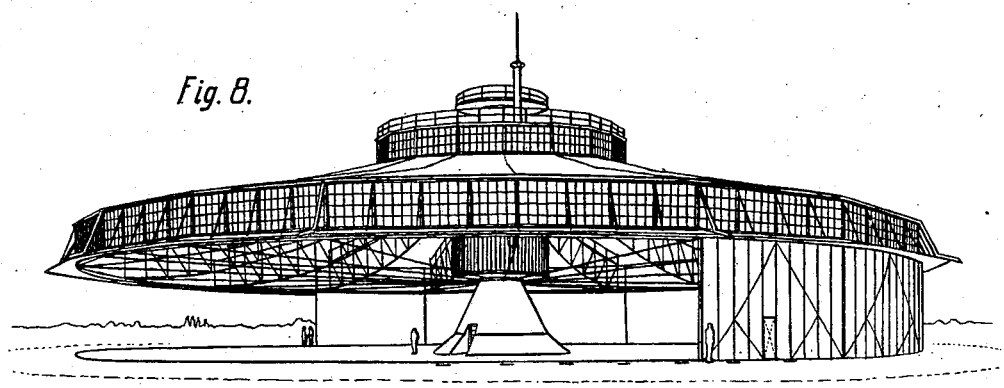
Figure 9:
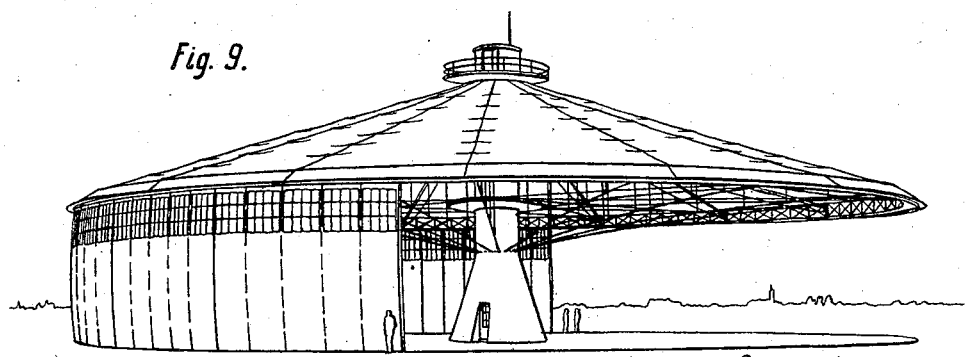

Figs. 5, 6 and 7 show diagrammatically the position of the sliding walls when the shed is entirely closed up, when it is opened to the extent of one quarter, and when it is half opened respectively, Figs. 8 and 9 are perspective views of the sheds according to Figs. 1 and 3 respectively, and Figs. 10, 11, 12 and 13 show diagrammatically by way of example various modifications of the arrangement of aircraft of six different sizes in a shed according to the invention.

Figure 2:
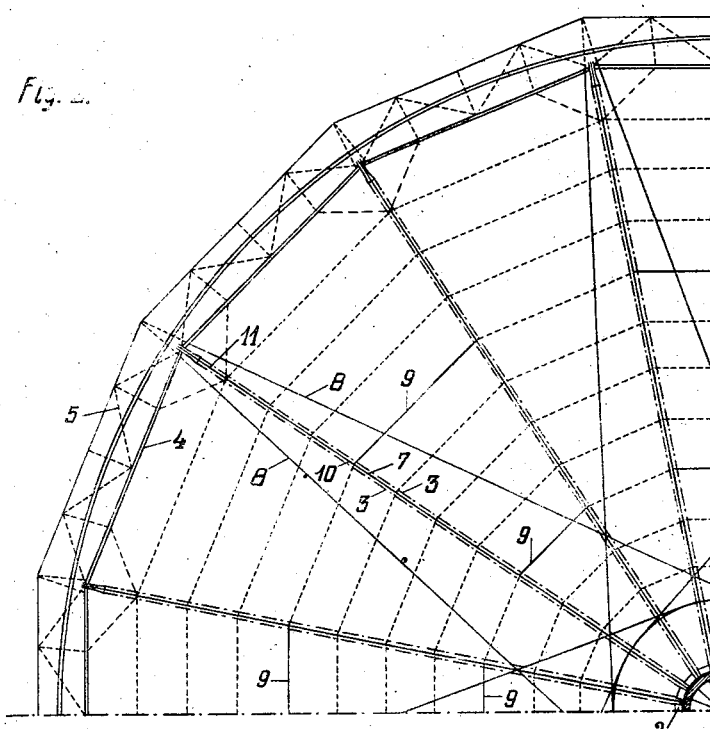
Fig. 2 is a corresponding plan of a quarter of the shed.

The constructional form shown in Figs. 1 and 2 is provided with the central supporting column 1, which may, for example, be constructed in the form of a concrete tower. On an upper ring 2 provided on this column, double tie members, such as chains or cables 3, are fastened, which carry a polygonal ring 4, which is provided with a horizontal lattice girder 5 for staying it in the horizontal plane and with a vertical lattice girder 6 for staying it in the vertical direction. In order to prevent any oscillation of the ring 4 the individual angular points are connected by means of tensioned anchoring cables 7 with a ring 14 arranged on the column 1. Any possible rotational movements of the ring 4 are prevented by means of double tie cables 8, which may, for example, be fixed to each alternate angular point of the polygon 4 and are preferably connected tangentially with the periphery of a platform 15 arranged on the column 1.

The roof supporting structure proper is constituted by the latticed suspension girders 10, the upper inner ends of which are linked to the ring 2, whilst their lower outer ends are connected by means of horizontal tie rods 11 with the individual angular points of the polygonal ring. The girders 10 are arranged between each pair of supporting cables 3 and are stiffened with regard to one another in pairs by means of lattice girders 9. The constructional advantages which are thus attained when the lower boom of the lattice girders is constructed in the form of funicular curve have already been set forth in the introduction.

The arcuate sliding wall panels may be of considerable number (for instance, eight) and may be arranged over the whole periphery of the aircraft shed. Their lower ends may be mounted and guided in a correspondingly shaped lower annular foundation. The upper edges of the panels must then be guided, or prevented from tipping over, as the case may be, by means of guides which may be arranged on the horizontal lattice girders 5. In Figs. 5, 6 and 7 the individual panels are denoted by I, II, III, IV, V, VI, VII and VIII. In the position shown in Fig. 5 the whole periphery of the shed is closed up, in Fig. 6 the panels VII and VIII are pushed behind the panels I and II so that a quarter of the periphery is opened, and in Fig. 7 the panels have been pushed behind one another in such manner that the entire half of the periphery is open.

If a rotary floor 17 (Fig. 1) of a type known per se is provided in the interior of the shed at the bottom, which floor rolls for instance by the aid of wheels 13 on annular rail track girders 16, the particular advantage can be obtained that every air vessel, as desired, can be brought into and out of the shed in the most favourable direction.

The modified constructional form shown in Figs. 3 and 4 only differs slightly from that just described, and is particularly suitable for temporary, tent-like aircraft sheds covered with canvas or the like, inasmuch as it permits of specially rapid erecting and dismantling. The central column 18 is in this case provided with an upper pull ring 19, from which the polygonal ring 21 is suspended by means of double tie members 20. The said polygonal ring consists, however, in this case of individual spaced lattice members linked to one another, the stiffening of which is effected by means of stretched cables 22, which firmly connect together every two alternate points of linkage of the ring 21. In this case also, in order to prevent oscillations of the ring 21 stretched anchoring cables 23 are employed, which cables are attached to the central column at 31, and in order to prevent rotary movements double cables 34 are employed which are connected to every second point of linkage and are tangentially attached to the circular platform 32.

The canvas or like covering 27 of the shed rests on cables 26, which are stretched between the ring 19 and the polygonal ring 21 and are pushed upwards by means of the supports 25 passing between the supporting cables 20 to such an extent that they come to rest between the supporting cables 20. The supports 25 are carried by the suspension supporting cable 24, which is fixed with corresponding tension between the ring 19 and the linkage points of the polygonal ring 21. In order to avoid tipping over of the supports 25, vertical auxiliary cables 28 are fixed at the individual points of support of the said supports on the cable 24, the lower ends of which auxiliary cables are attached to corresponding points on the stretched anchoring cable 23. In this way the load of the canvas or like covering 27 is transmitted by means of the supports 25 to the suspension cables 24, which cause a concentric compressive stress on the polygonal ring 21. The vertical auxiliary cables 28 also serve for holding the canvas or like covering in position when there is a wind pressure below it (when the panels are opened).

The side wall panels of such aircraft sheds are preferably constructed of frames 29, which are provided on their exteriors with a covering 30 of canvas or the like. The said panels may be constructed so as to be all movable (as described above), or so as to be partly fixed and partly movable. In the latter case, i. e. when one part of the periphery is fitted with fixed panels, the cables 34 are unnecessary, inasmuch as there is in this case no fear of rotational movements of the polygonal ring.

The erection of the polygonal ring and the supporting lattice work members of the new aircraft sheds described is always effected on the ground. They are raised by means of lifting devices which are attached to the rings 2 or 19 respectively, which renders it possible to effect the erection in a very short time.

Figure 10:
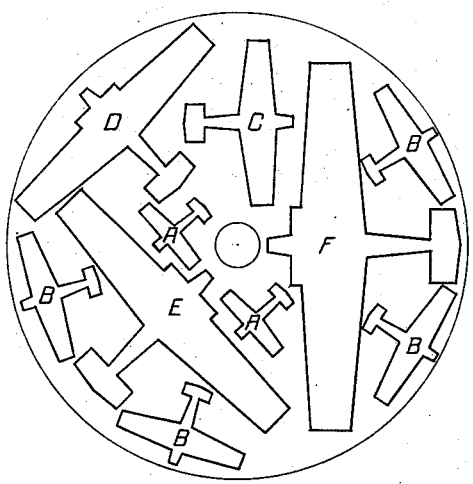
Figure 11:
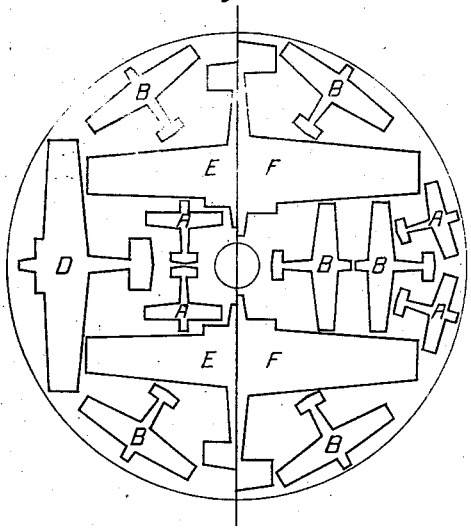
Figure 12:
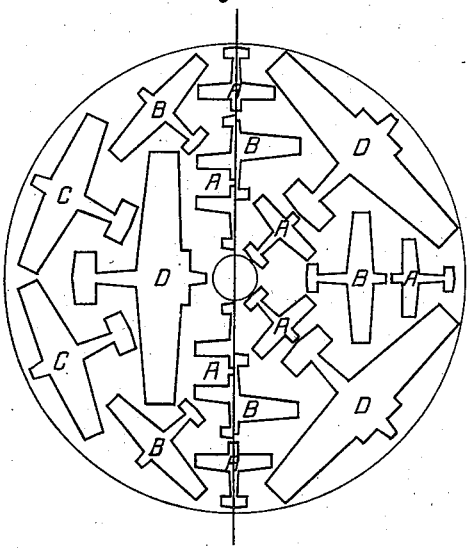
Figure 13:
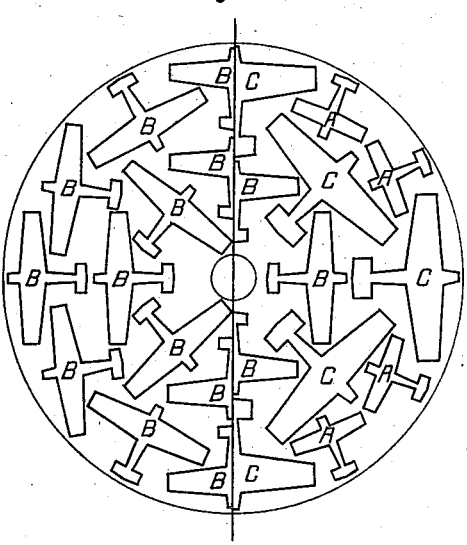

In Figs. 10, 11, 12 and 13 various possible arrangements for the disposition in the shed of aircraft of different sizes are shown diagrammatically. The individual aircraft are, according to their size, denoted by the reference letters A, B, C, D, E and F. Fig. 10 shows the shed occupied by all sizes of aircraft, Fig. 11 shows it on the left hand side occupied by aircraft A, B, D and E, and on the right hand side by A, B and F, Fig. 12 shows it on the left hand side occupied by aircraft A, B, C and E, and on the right hand side by A, B and D. Fig. 13 shows it on the left hand side occupied by aircraft B only, and on the right hand side by A, B and C. The very efficient manner in which the available floor surface can be utilized will be obvious from these last named figures.

I claim:—

1. A circular shed for aircraft, comprising in combination: a round roof structure having no peripheral supporting struts; a polygonal ring upon which said roof structure rests; a horizontal lattice girder on said polygonal ring for stiffening said polygonal ring in the horizontal plane; a vertical lattice girder on said polygonal ring for stiffening said polygonal ring in the vertical direction; a central column; lattice members for suspending said roof structure from said central column; radial tie members attached at their upper ends to the upper part of said central column and serving to suspend said polygonal ring from said central column; anchoring cables attached to said polygonal ring and adapted to secure said ring against oscillations; tie rods attached to said polygonal ring and adapted to secure said polygonal ring against rotational movements; and a circular platform on said central column to which platform said tie rods are also attached.

2. A circular shed for aircraft as specified in claim 1, wherein said radial tie members consist of double cables.

3. A circular shed for aircraft, comprising in combination: a round roof structure having no peripheral supporting struts; a polygonal ring upon which said roof structure rests; a horizontal lattice girder on said polygonal ring for stiffening said polygonal ring in the horizontal direction; a vertical lattice girder on said polygonal ring for stiffening said polygonal ring in the vertical direction; a central column; radial tie members attached at their upper ends to the upper part of said central column and serving to suspend said polygonal ring from said central column; lattice members for suspending said roof structure from said central column, said lattice members being arranged between said tie members and being linked at their inner upper ends to the upper part of said central column; horizontal tie members for linking said lattice members at their outer lower ends to said polygonal ring; anchoring cables attached to said polygonal ring and adapted to secure said ring against oscillations; tie rods attached to said polygonal ring and adapted to secure said polygonal ring against rotational movements; and a circular platform on said central column, to which platform said tie rods are attached.

4. A circular shed for aircraft, as specified in claim 1, wherein the polygonal ring comprises individual lattice members which are linked to one another in combination with tie members connecting each two alternate points of linkage of said last named lattice members and adapted to stay said last named lattice members in the horizontal plane.

5. A circular shed for aircraft as specified in claim 1, in further combination with a canvas covering for said roof structure; radially arranged cables on which said covering rests; a plurality of vertical columns supporting said cables; suspension tie members supporting said columns and linked at their outer lower ends to said polygonal ring; and a ring arranged on the upper part of said central column, to which ring the inner upper ends of said tie members are attached; said polygonal ring comprising individual lattice members which are linked to one another, in combination with tie members connecting each two alternate points of linkage of said last named lattice members and adapted to stay said last named lattice members in the horizontal plane.

6. A circular shed for aircraft, as specified in claim 1, in further combination with: a canvas covering for said roof structure; radially arranged cables on which said covering rests; a plurality of vertical columns supporting said cables and projecting beyond said radial tie members; suspension tie members supporting said columns and linked at their outer lower ends to said polygonal ring; a ring on the upper part of said central column, to which ring said tie members are attached; and auxiliary cables connecting said vertical columns with said anchoring cables, which latter are arranged vertically below said suspension tie members; said polygonal ring comprising individual linked lattice members in combination with tie members connecting each two alternate points of linkage of said last named lattice members and adapted to stay said last named lattice members in the horizontal plane.

7. A circular shed for aircraft, as specified in claim 1, in further combination with: a plurality of arcuate peripheral sliding wall panels, and a foundation ring in which the lower ends of said panels are mounted and guided so as to be slidable therein.

8. A circular shed for aircraft as specified in claim 1, in further combination with: a plurality of arcuate peripheral sliding wall panels; a foundation ring in which the lower ends of said panels are mounted and guided; and guide members arranged on said horizontal lattice girder in which guide members the upper ends of said panels are guided, in order to render possible accurate guiding and tight closure of the said panels.

9. A circular shed for aircraft as specified in claim 1, in further combination with a rotary floor, upon which the aircraft rest and which renders possible the bringing in and out of the aircraft on the side of the shed which is most favourable with regard to the direction of the wind at the time in question.

10. A circular shed for aircraft, as specified in claim 1 in further combination with a plurality of peripheral wall panels, some of which are fixed, whilst the others are slidable with regard to said fixed panels, said wall panels comprising stiffened frames covered with canvas.

11. A circular shed for aircraft, as specified in claim 1, wherein the central column is portable and is constructed of structural parts which can be detached from one another.

12. A circular shed for aircraft, comprising in combination: a round roof structure; one single central column serving as sole support for said roof structure; a horizontal peripheral ring under compression; radial tierods for suspending said peripheral ring from the said column; radial anchoring tie members connecting every angle point of the peripheral ring with the central column; and radial roof supporting girders suspended between the said peripheral ring and the said central column.

13. A circular shed for aircraft, comprising in combination: a round roof structure; one single central column in the form of a reinforced concrete or iron tower serving as sole support for said roof structure; a horizontal peripheral ring under compression; radial tierods for suspending said peripheral ring from said column; radial anchoring tie members connecting every angle point of the peripheral ring with the central column; and radial roof supporting girders suspended between the said peripheral ring and the said central column.

Signed at Warsaw, Poland, this seventh day of April, 1928.

FRANCISZEK WASILKOWSKI.